(12) United States Patent  
Yudin et al.

(10) Patent No.: US 9,189,630 B1  
(45) Date of Patent: Nov. 17, 2015

(54) SYSTEMS AND METHODS FOR ACTIVE OPERATING SYSTEM KERNEL PROTECTION

(71) Applicant: Kaspersky Lab ZAO, Moscow (RU)

(72) Inventors: Maxim V. Yudin, St. Petersburg (RU); Alexander S. Tarasenko, St. Petersburg (RU); Vyacheslav I. Levchenko, St. Petersburg (RU); Igor Y. Kumagin, Nizhny Novgorod (RU)

(73) Assignee: AO KASPERSKY LAB, Moscow (RU)

( * ) Notice: Subject to any disclaimer, the term of this patent is extended or adjusted under 35 U.S.C. 154(b) by 0 days.

(21) Appl. No.: 14/601,331

(22) Filed: Jan. 21, 2015

(51) Int. Cl.  
*G06F 21/56* (2013.01)  
*G06F 9/455* (2006.01)

(52) U.S. Cl.  
CPC .......... *G06F 21/566* (2013.01); *G06F 9/45558* (2013.01); *G06F 2009/45587* (2013.01); *G06F 2221/034* (2013.01)

(58) Field of Classification Search  
CPC ....... G06F 21/566; G06F 21/57; G06F 21/53; G06F 21/3218; G06F 2221/034; G06F 2009/45587; G06F 9/45558  
USPC ...................................... 713/164; 726/22, 24  
See application file for complete search history.

(56) References Cited

U.S. PATENT DOCUMENTS

| | | | |
|---|---|---|---|
| 7,971,255 B1 * | 6/2011 | Kc et al. ........................... | 726/24 |
| 7,996,836 B1 * | 8/2011 | McCorkendale et al. ........ | 718/1 |
| 8,091,086 B1 | 1/2012 | Ershov et al. | |
| 8,099,596 B1 | 1/2012 | Rusakov et al. | |
| 8,225,317 B1 | 7/2012 | Chiueh et al. | |
| 8,250,519 B2 | 8/2012 | Budko et al. | |
| 8,261,265 B2 | 9/2012 | Chen et al. | |
| 8,271,450 B2 | 9/2012 | Horovitz et al. | |
| 8,365,297 B1 | 1/2013 | Parshin et al. | |
| 8,423,747 B2 | 4/2013 | Durham et al. | |
| 8,464,252 B2 | 6/2013 | Schneider | |
| 8,694,738 B2 | 4/2014 | Bhattacharjee et al. | |
| 8,775,802 B1 * | 7/2014 | Kargman et al. ............. | 713/166 |
| 8,863,283 B2 | 10/2014 | Sallam | |
| 8,868,880 B2 | 10/2014 | Devine et al. | |
| 8,869,300 B2 | 10/2014 | Singh et al. | |
| 8,875,295 B2 * | 10/2014 | Lutas et al. ..................... | 726/24 |

(Continued)

OTHER PUBLICATIONS

Kernel Patch Protection: Frequently Asked Questions. Window Drivers. Updated Jan. 22, 2007. 3 pages. http://msdn.microsoft.com/en-us/library/windows/hardware/dn613955(v=vs.85).aspx.

(Continued)

*Primary Examiner* — Matthew Smithers  
(74) *Attorney, Agent, or Firm* — Patterson Thuente Pedersen, P.A.

(57) ABSTRACT

Systems and methods for intercepting computing device system calls for a computing device including a kernel having a system call table. A hypervisor is executed on the computing device, the hypervisor configured to control at least one of the computing device processor registers. At least one modified kernel structure is created, the modified kernel structure including a modified system call table. A memory address of an original system call handler is determined, the original system call handler configured to receive kernel operation commands. A size of a loaded image of the original system call handler is determined. A copy of the original system call handler as a second system call handler is created, and the second system call handler intercepts a computing device system call.

20 Claims, 8 Drawing Sheets

(56) References Cited

U.S. PATENT DOCUMENTS

| | | | |
|---|---|---|---|
| 8,881,145 B2* | 11/2014 | Chiueh et al. | 718/1 |
| 2009/0300307 A1 | 12/2009 | Carbone et al. | |
| 2010/0299665 A1 | 11/2010 | Adams | |
| 2011/0047542 A1* | 2/2011 | Dang et al. | 718/1 |
| 2012/0255004 A1 | 10/2012 | Sallam | |
| 2013/0091568 A1 | 4/2013 | Sharif et al. | |
| 2013/0097356 A1* | 4/2013 | Dang et al. | 711/6 |
| 2013/0117848 A1* | 5/2013 | Golshan et al. | 726/23 |
| 2013/0132690 A1* | 5/2013 | Epstein | 711/159 |
| 2013/0276056 A1* | 10/2013 | Epstein | 726/1 |
| 2013/0347131 A1* | 12/2013 | Mooring et al. | 726/29 |
| 2015/0013008 A1 | 1/2015 | Lukacs et al. | |
| 2015/0033227 A1* | 1/2015 | Lin et al. | 718/1 |

OTHER PUBLICATIONS

European Search Report for European Application No. 15155046 dated Jun. 18, 2015.

\* cited by examiner

SYSTEMS AND METHODS FOR ACTIVE OPERATING SYSTEM KERNEL PROTECTION

TECHNICAL FIELD

The invention relates generally to antivirus systems and methods and, more particularly, to computing systems and associated methods for handling system calls.

BACKGROUND

Traditionally, antivirus systems utilize the interception of systems calls in order to detect malicious programs. Detection can occur as early as the execution stage. For example, systems calls that are performing suspicious activities, such as the writing of an executable file to the Windows folder, can be intercepted. The originating executable can be identified as potentially (or likely) malicious. As a result, it is possible to block even unknown malicious programs, which is an advantage of current antivirus systems.

However, the ability to intercept system service calls in particular versions of the Windows operating system (OS) is limited by the Microsoft-implemented protections. Kernel Patch Protection (KPP), informally known as PatchGuard, is a feature of 64-bit (x64) editions of Microsoft Windows that prevents patching the kernel. PatchGuard prevents the use of the aforementioned traditional interception methods. PatchGuard tracks changes in a number of important objects of the kernel of the OS (for example, malicious changes caused by the operation of rootkits, or modifications by outside software, such as antiviruses) and take appropriate action if changes are detected. For example, PatchGuard can cause a system crash when detecting changes in the system calls table or the Interrupt Descriptor Table (IDT).

Existing solutions offer the ability to bypass the protections of PatchGuard and other similar solutions. For example, a hypervisor can be utilized to bypass PatchGuard to create interceptors of the kernel objects, without a system crash. Bypassing PatchGuard is therefore possible with the help of hardware virtualization. However, the creation of interceptors for kernel objects (for example, SSDT monitoring) requires knowledge of the internal structure of those kernel objects. The kernel object structure can vary depending on OS version. As a result, multiple versions of the interceptor are required to support multiple versions of an OS and its particular kernel object structure(s).

Therefore, there is a need for systems and methods for handling system calls that are effective, efficient, and implementable in multiple versions of operating systems having varying kernel object structures.

SUMMARY

Embodiments of the present application substantially meet the aforementioned needs of the industry. In an embodiment, a machine-implemented method for intercepting computing device system calls, wherein the computing device includes a kernel including a system call table, comprises executing a hypervisor on the computing device, the hypervisor configured to control at least one computing device processor register, the at least one computing device processor register configured to be used by the kernel; creating at least one modified kernel structure, the modified kernel structure including a modified system call table; determining a memory address of an original system call handler, the original system call handler configured to receive and execute kernel operation commands; determining a size of a loaded image of the original system call handler; creating a copy of the original system call handler as a second system call handler; and intercepting, by the second system call handler as directed by the hypervisor, a computing device system call.

In an embodiment, a system for intercepting computing device system calls comprises a computing platform including computing hardware of at least one processor, data storage, and input/output facilities, an operating system implemented on the computing hardware, a kernel including a system call table, and a system call handler configured to receive and execute kernel operation commands, a plurality of computing platform processor registers; and instructions that, when executed on the computing platform, cause the computing platform to implement: a hypervisor configured to control at least one of the computing platform processor registers, the at least one computing platform processor register configured to be used by the kernel, and an intercept engine configured to: create a copy of the system call table as a second system call table, create a copy of the system call handler as a second system call handler, and intercept, by the second system call handler as directed by the hypervisor, a computing platform system call.

In an embodiment, a system for intercepting computing device system calls, the computing device including a kernel including a system call table comprises means for executing a hypervisor configured to control at least one computing device processor register, the at least one computing device processor register configured to be used by the kernel; means for creating a modified system call table; means for determining a memory address of an original system call handler, the original system call handler configured to receive and execute kernel operation commands; means for determining a size of a loaded image of the original system call handler; means for creating a copy of the original system call handler as a second system call handler; and means for intercepting, by the second system call handler as directed by the hypervisor, a computing device system call.

The above summary is not intended to describe each illustrated embodiment or every implementation of the invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
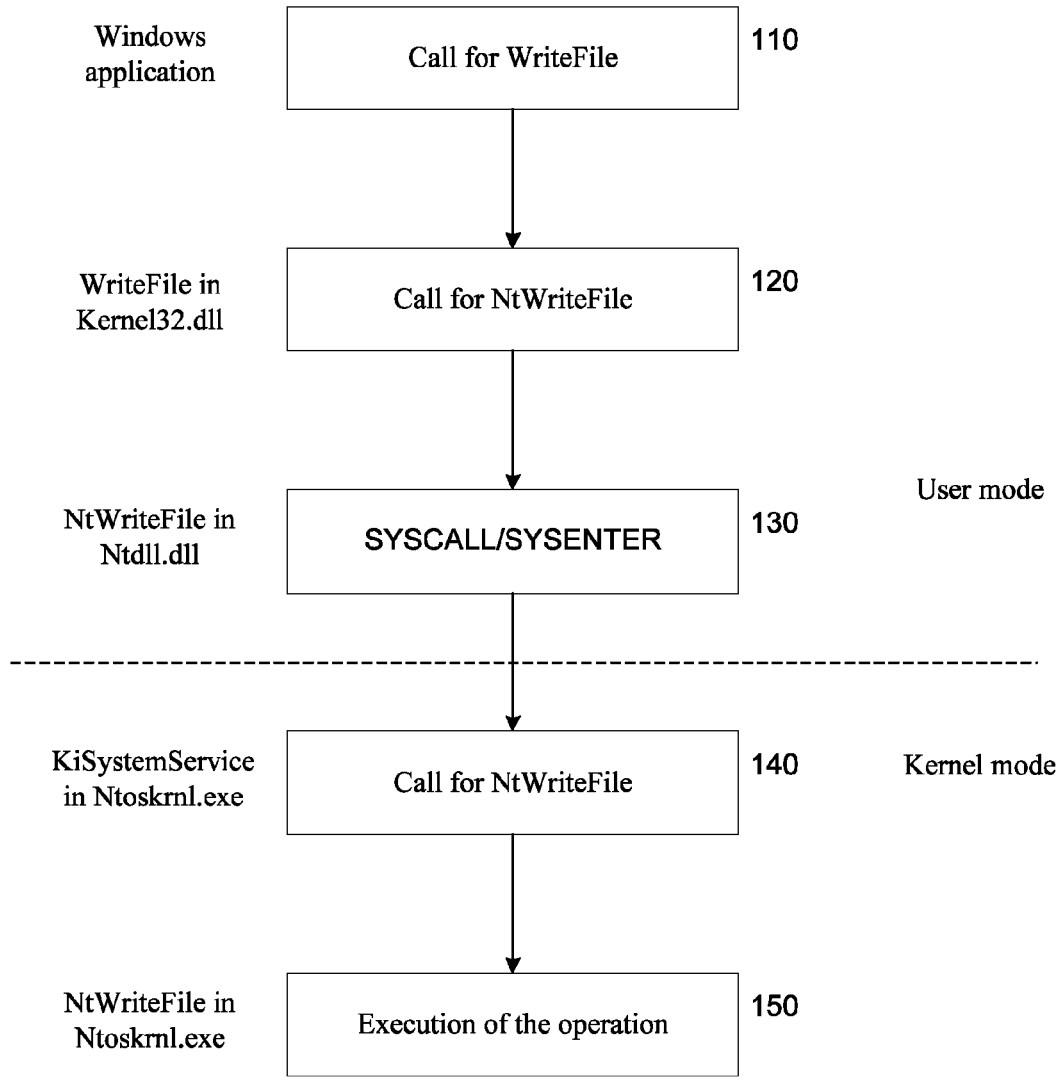
FIG. 1 is a flowchart of an exemplary execution of an application programming interface (API) function in a Windows operating system, according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Aspects of the invention are directed towards systems and methods for handling computer system calls that are implementable in multiple versions of operating systems having varying internal kernel object structures.

The computer system can be one physical machine, or can be distributed among multiple physical machines, such as by role or function, or by process thread in the case of a cloud computing distributed model. In various embodiments, aspects of the invention can be configured to run in virtual machines that in turn are executed on one or more physical machines. It will be understood by persons of skill in the art that features of the invention may be realized by a variety of different suitable machine implementations.

The system includes various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

As an initial matter, a description of the operation of system function call in a Windows OS is provided. Referring to FIG. 1, a flowchart of an exemplary execution of an API function in a Windows operating system is depicted. In the example illustrated, the API function "WriteFile" is depicted. In an embodiment, WriteFile writes data to a specified file or input/output (I/O) device.

At 110, a Windows application attempts to write data to a file by calling the relevant Win32 API function WriteFile in dynamic-link library (DLL) Kernel32.dll. For example, the Windows applications Microsoft Word or Notepad can respectively call the API function WriteFile.

At 120, a call for NtWriteFile is made. In embodiments, a corresponding call to the related system function is made. For example, in embodiments, the call to NtWriteFile is made via Ntdll.dll. In other embodiments, other system function DLLs are utilized for the respective system function called.

At 130, a call for a system interrupt at 130 is made. In an embodiment, a search for the relevant handler is likewise conducted. In an embodiment, a search for the relevant handler is done by the KiSystemService function in Ntoskrnl.exe during the call for NtWriteFile. In other embodiments, other system service functions are utilized for the search for the relevant handler.

At 140, a call for NtWriteFile occurs. In an embodiment, the call for the operation is done in Ntoskrnl.exe. In other embodiments, other DLLs are utilized for the call for the respective operation.

At 150, execution of the operation occurs. In the illustrated embodiment, a direct writing of a file or I/O device occurs. In an embodiment, NtWriteFile is executed in Ntoskrnl.exe. In other embodiments, execution utilizes other executables or DLLs to execute the respective operations.

In an embodiment, as depicted in FIG. 1, a user mode comprises the operations of 110, 120, and 130. The operations of 110, 120, and 130 occur in the user mode, and, after the call for the interruption, a transition to the kernel mode occurs. In an embodiment, as depicted in FIG. 1, a kernel mode comprises the operations of 140 and 150. Referring again to 130, in x86 architecture processors, the transition from user mode to kernel mode requires a call for the SYSCALL/SYSENTER instruction (hereinafter, only SYSCALL will be used). In x64 architecture processors, the address of this handler is stored in the LSTAR (Long System Target-Address Register) register, which belongs to MSRs (Machine Specific Registers).

Figure 2:
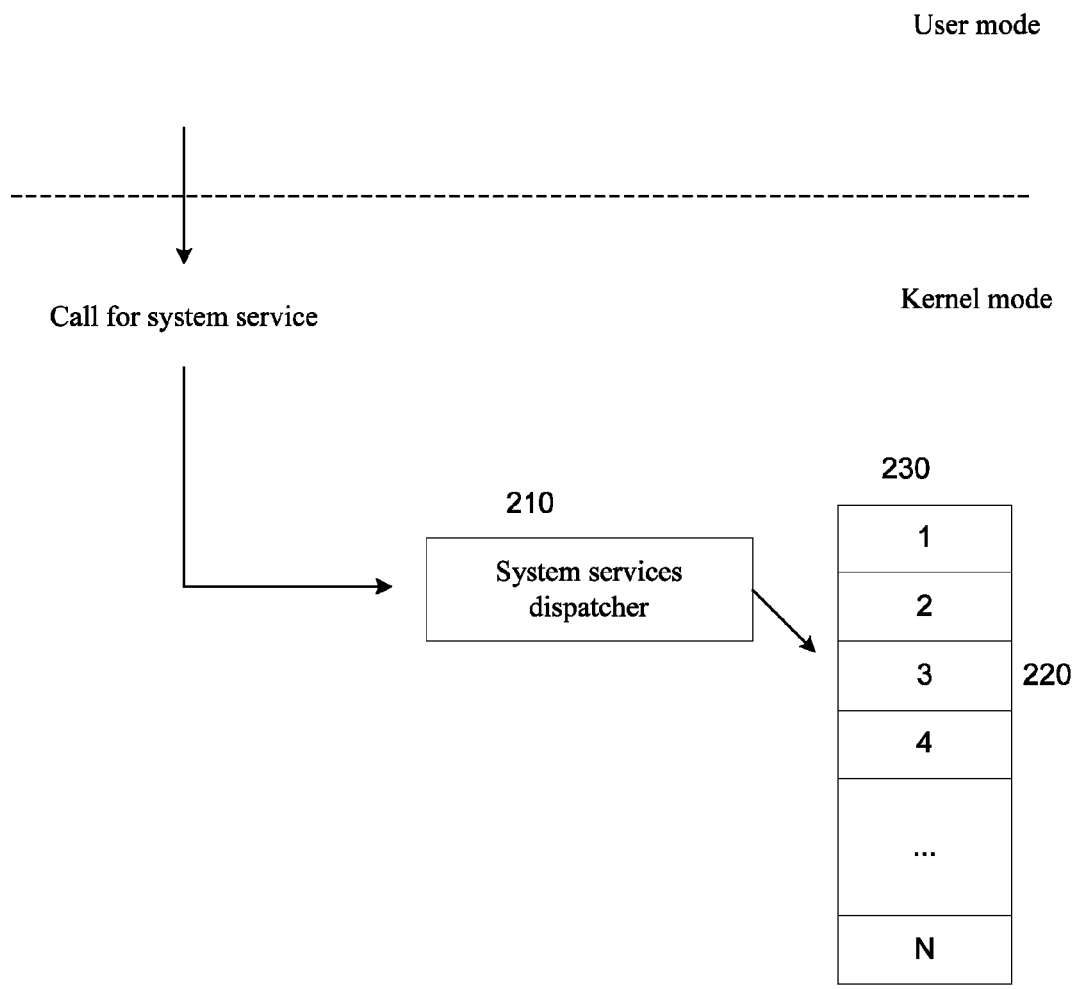
FIG. 2 is a block diagram of an example of a system service call, according to an embodiment.

Referring to FIG. 2, a block diagram of such a system service call is depicted, according to an embodiment. As shown, user mode and kernel mode likewise map to the corresponding user mode and kernel mode described in FIG. 1.

During the transition to kernel mode in a call for system service, the system services dispatcher 210 copies the system call arguments from the user mode thread stack to its own kernel mode stack (so that the user cannot change the arguments when the kernel accesses them). For example, in Windows OSs, the dispatcher is KiSystemService. System services dispatcher 210 is further configured to run the particular system service 220 from the system services table 230. For example, in Windows OSs, the system services table is the System Service Dispatch Table (SSDT).

As a result, when operating protection tools such as Patch Guard are utilized, a modification of system service 220 requires a modification of system services table 230 itself, which can cause a system crash. In an embodiment, in order to bypass such a restriction, a separate copy of system services table 230 can be created, with a separate handler for the SYSCALL call (hereinafter, we will use the term handler for simplicity), in order to use the separate copy of the system services table. In an embodiment, the copy of the system services table comprises operating system structures related to system function calls.

Figure 3:
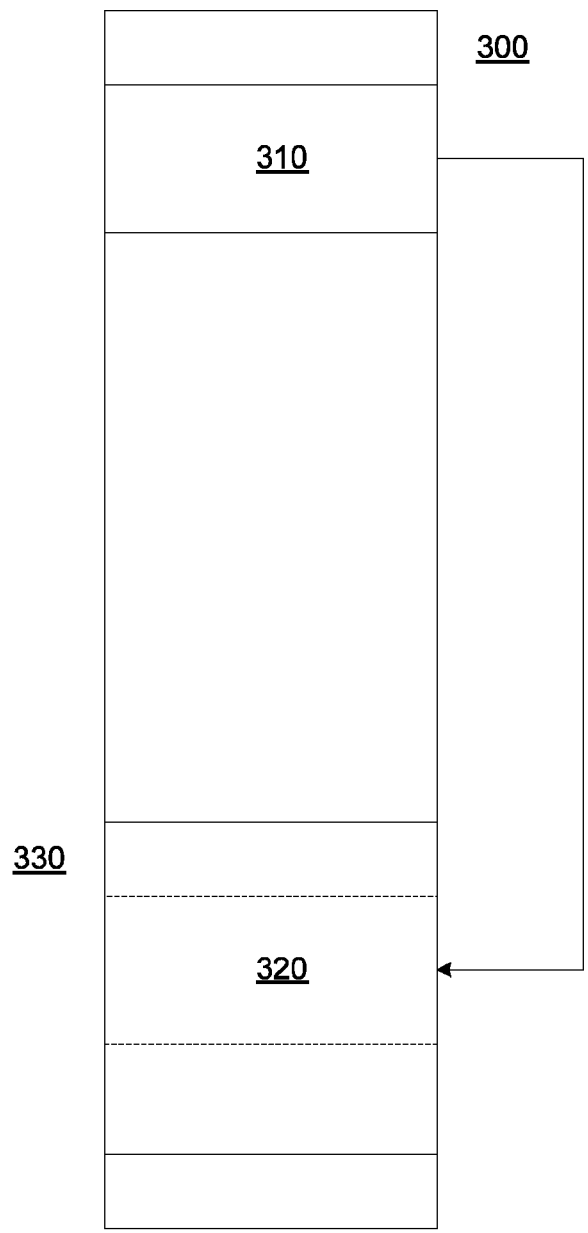
FIG. 3 is a block diagram of an address space of a kernel implementing a system call handler, according to an embodiment.

Referring to FIG. 3, a block diagram of address space of a kernel implementing a system call handler is depicted, according to an embodiment. In an embodiment, the call handler comprises a handler of a particular file operation. FIG. 3 depicts an address space 300 for the kernel.

In an embodiment, at a particular address location, an original handler 310 is loaded. Original handler 310 can be modified, as will be described, by any number of suitable techniques. In an embodiment, modification of original handler 310 comprises address substitution (for example, by modifying SSDT/IDT tables). In another embodiment, modification of original handler 310 comprises direct modification of the original handler 310 (for example, using splicing). In another embodiment, modification of original handler 310 comprises modification of the body of the system function itself. For example, by substituting the address of the original handler 310 with the address of a substitute handler 320, an antivirus check of a number of file or register operations can be conducted, as will be described. Any of the aforementioned approaches can be utilized in combination or in partial combination.

In an embodiment, since PatchGuard checks the values of the MSR register, it may not be possible to substitute the values of the MSR register (this register is discussed below in more detail) using the above-described techniques.

Figure 4:
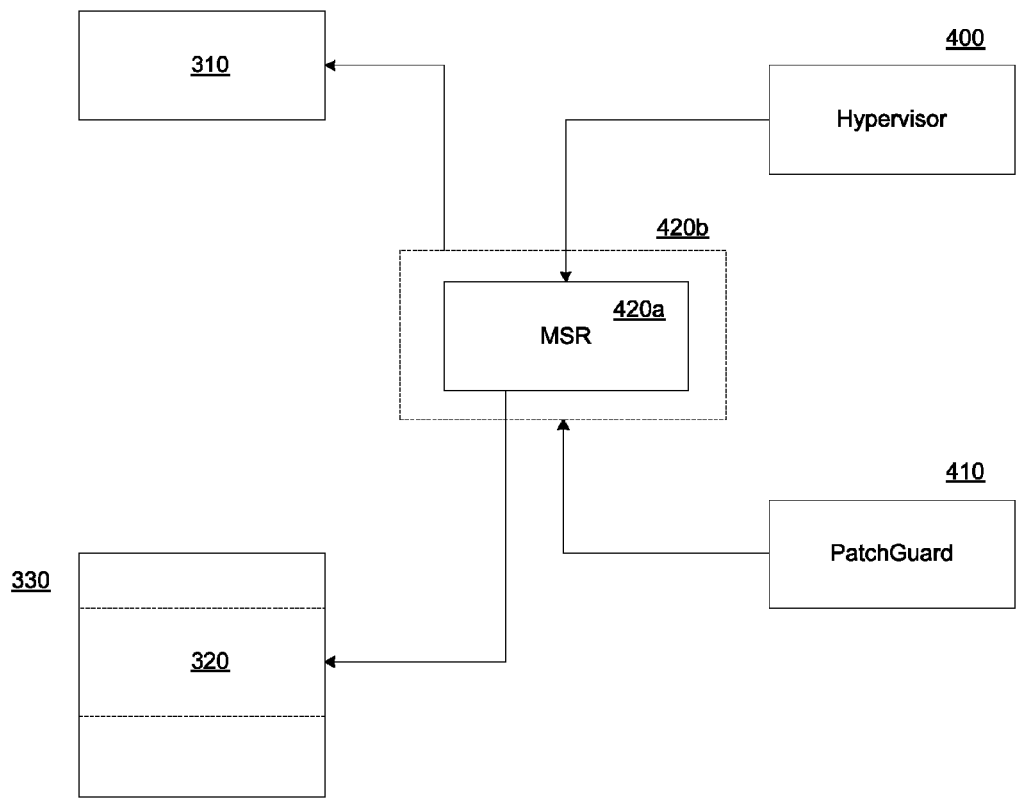
FIG. 4 is a block diagram of components of an engine for handing system calls using a hypervisor, according to an embodiment.

Referring to FIG. 4, virtualization utilizing a hypervisor can bypass KPP tools such as PatchGuard. In an embodiment, the virtualization using a hypervisor can be implemented on systems such as those depicted in FIGS. 7 and 8, as will be discussed. In an embodiment, hypervisor 400 is utilized to bypass PatchGuard 410. In an embodiment, hypervisor 400 comprises a virtual machine monitor (VMM). In embodiments, the VMM is a piece of computer software, firmware, or hardware that creates and runs virtual machines.

Hypervisor 400 can include a high privilege level for execution. For example, hypervisor 400 can be level (−1), the kernel can be level (0), and user application level can be (3). In embodiments, hypervisor 400 can be loaded at any time; for example at the start of the OS or during operation of the OS. At the initialization of hypervisor 400, a list of instructions is assigned, which can be intercepted. For example, in order to intercept the SYSCALL instruction, it is sufficient to specify the interception of RDMSR (reading of MSRs) and WRMSR (writing to MSRs) instructions.

Therefore, using hypervisor 400, the MSR register can be controlled. In an embodiment, for example, the MSR register is the LSTAR. In certain embodiments, hereinafter for readability purposes, simply the term MSR is used. In an embodiment, controlling the MSR register comprises writing the required value 420a to the MSR and further saving the original value as a copied value 420b. This allows the copied value 420b to be read by protection tools like PatchGuard (without causing a system crash), and, at the same time, allows a modified handler to use the required value 420a.

Figure 5:
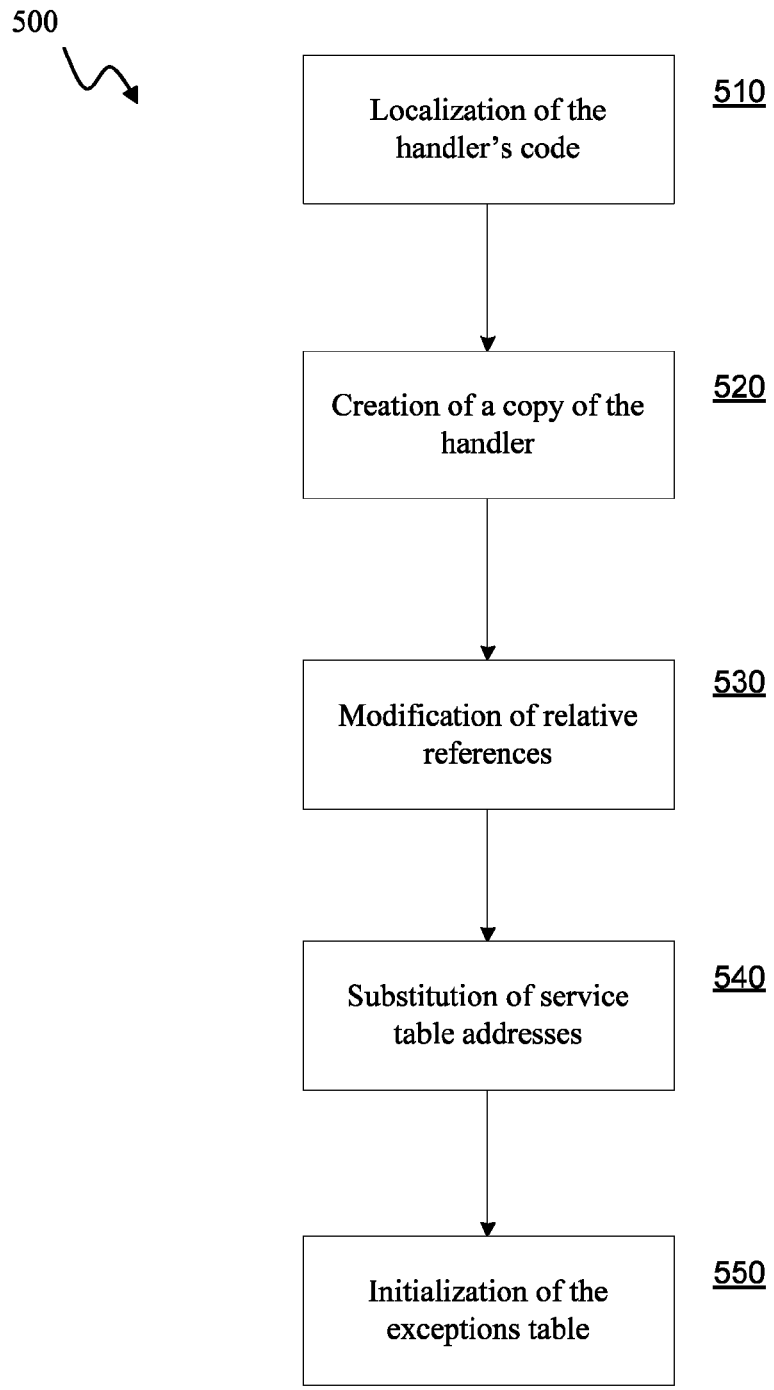
FIG. 5 is a flowchart of a method for loading a system call handler, according to an embodiment.

Referring to FIG. 5, a flowchart of a method for loading a system call handler is depicted, according to an embodiment. In an embodiment, a loading engine is configured to load a system call handler as described herein.

The method 500 of FIG. 5 comprises, at 510, determining, in the memory, the address of the code of original handler 310. In an embodiment, at 510, a determination of the size of the loaded image and its location in the memory is made. In embodiments, this is referred to as "localization" of the code of the original handler 310.

At 520, a copy of original handler 310 is created. In an embodiment, the copy of original handler 310 is made in the form of an image, thereby creating substitute handler 320. According to embodiments, the memory size for the copy can be allocated by taking into account the possible changes of substitute handler 320 and its respective variables and operations. In an embodiment, space can be allocated in the memory of an already loaded driver 330, which can simplify the modification of substitute handler 320.

At 530, modification of relative references is performed. In an embodiment, the relative references related to substitute handler 320 are modified.

At 540, substitution of service address tables is performed. In an embodiment, replacement of addresses of service tables (for example, SSDT) can be made in the code of substitute handler 320.

At 550, initialization of one or more exceptions tables is performed. In an embodiment, once initialized, the exceptions related to the execution of the code of substitute handler 320 can be correctly handled. All the above-mentioned modifications can be made using a disassembler, which can be utilized for disassembly of original handler 110 commands and their subsequent modification (for example, 530 to 550). These modifications can be utilized to completely and properly replace original handler 310. Further. other modifications can relate to various issues of computer security related to the analysis of intercepted calls.

Once substitute handler 320 is initialized, substitute handler 320 can be used to intercept system calls. For example, substitute handler 320 can intercept file and register operations, as well as operations related to the taking of screenshots. In the latest Windows OS versions, substitute handler 320 can intercept file and register operations using the OS's API itself.

Within various operating systems, a certain class of malicious programs generates screenshots with the purpose of isolating important user information (for example, passwords). In order to counter such programs, embodiments ensure monitoring of the interceptions of the functions related to the taking of screenshots. A number of techniques can be utilized that allow a descriptor of a window of the required application to be obtained, from which a copy the bitmap from can be made. In other embodiments, Direct3D surfaces can be converted into a bitmap directly in the memory, which can be subsequently saved for analysis. In order to be able to track malicious applications which use such techniques, embodiments ensure the interception of the SYSCALL call, but also modify the SSDT table for the interception of the required calls.

According to embodiments, hypervisor 400 does not need to always be loaded or held in memory during operation of the OS. For example, hypervisor 400 can also be loaded during operation of the OS in a number of conditional situations, or combination of conditional situations.

In an embodiment, hypervisor 400 can be loaded during operation of the OS if a critical application (for example, a banking application) is loaded, for which it is also useful to ensure protection from the taking of screenshots.

In an embodiment, hypervisor 400 can be loaded during operation of the OS if a user access a site of a bank or of a payment system (for example, PayPal), for which it is also useful to ensure protection from the taking of screenshots.

In an embodiment, hypervisor 400 can be loaded during operation of the OS if an antivirus application requires the presence of self-protection (i.e. protection from attempts to end the antivirus application process or to stop the operation of the antivirus driver). In such embodiments, tracking the relevant system calls is likewise useful.

In an embodiment, hypervisor 400 can be loaded during operation of the OS if a flexible application control is utilized by the OS. For example, if an OS is using the substitution of system calls, or if an OS is utilizing an isolated environment (sandbox), tracking the relevant system calls is likewise useful.

In an embodiment, hypervisor 400 can be loaded during operation of the OS as part of a check of a suspicious application and any emulation of the suspicious application. For example, a suspicious application may implement calls not for the actual handlers of the kernel's service functions, but for special functions of the OS's behavior emulator. In such cases, the application "thinks" that it is being run on the actual system, but no modifications to the actual OS are made. On the basis of emulator protocols, the degree of the application's hazardousness is determined. In embodiments, such a check can be performed either on the user's machine or on a dedicated cloud service.

In embodiments, additional situations or conditional scenarios can be utilized to load a hypervisor. Further, a hypervisor can be loaded prior to or any time up to a termination of the OS. The foregoing conditional situations in no way limit when a hypervisor may be loaded, as these embodiments are given only by way of example and are not intended to limit the scope of the invention.

Figure 6:
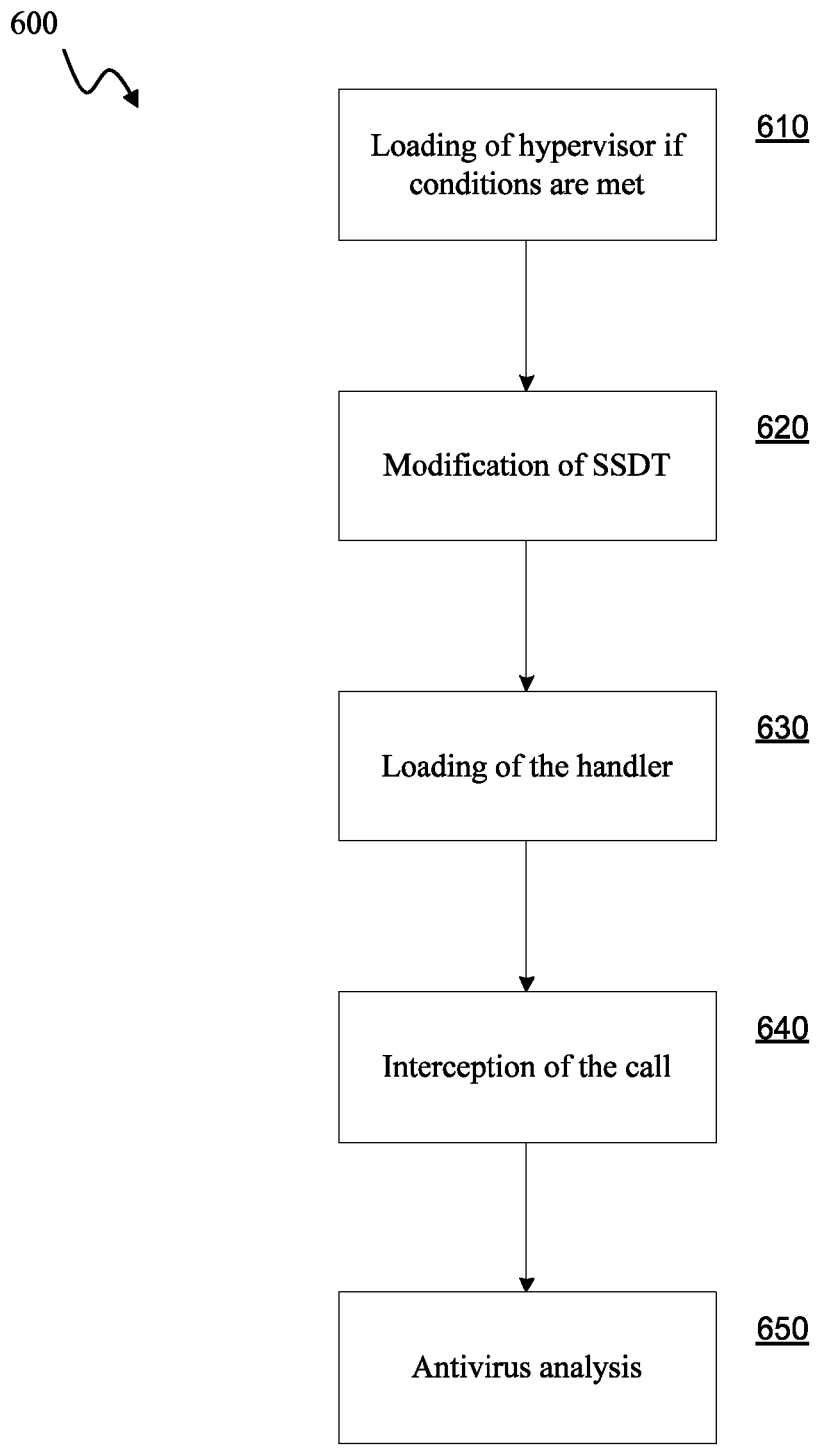
FIG. 6 is a flowchart of a method for handling system calls, according to an embodiment.

Referring to FIG. 6, a flowchart of a method for handling system calls is depicted, according to an embodiment. In an embodiment, a handling engine is configured to intercept one or more system calls as described herein.

The method 600 of FIG. 6 comprises, if one of the aforementioned conditional situations is satisfied, loading a hypervisor at 610. In other embodiments, a hypervisor can be loaded according to other criteria. In embodiments, the hypervisor can be substantially similar to hypervisor 400 described above.

At 620, the SSDT table is modified. In an embodiment, both SSDT and IDT tables are modified. Such modification can comprise address substitution as described with respect to FIG. 3.

At 630, a SYSCALL function handler is loaded. In an embodiment, the loading of a SYSCALL function handler comprises a method for loading a system call handler substantially similar to the method described with respect to FIG. 5. In an embodiment, the system call handler comprises a handler substantially similar to substitute handler 320.

At 640, the system call handler (i.e. substitute handler 320) intercepts a system call. In an embodiment, the system call handler utilizes the modified SSDT table to obtain a context of the system call. For example, based on data about the system call, it can be determined what process made the call.

At 650, an antivirus analysis can be conducted. In an embodiment, the antivirus analysis determines if the process that made the call is malicious. In embodiments, malicious behavior can be determined. Therefore, at 650, the modified handler is called and the address is specified in the modified SSDT table.

It should be also noted that, in some cases, a synchronization of the original and modified SSDT tables may be required. The original SSDT table can be updated as part of a hot patching procedure.

In addition, embodiments of an interception system using a hypervisor can be implemented so as to not decrease any OS protection level ensured by the PatchGuard or similar technology. Because all the modules loaded on x64 systems undergo a signature check, it is possible to use a hypervisor to protect a copy of the interceptor and a copy of service tables from being modified, ensuring an even more reliable equivalent of the PatchGuard protection.

Figure 7:
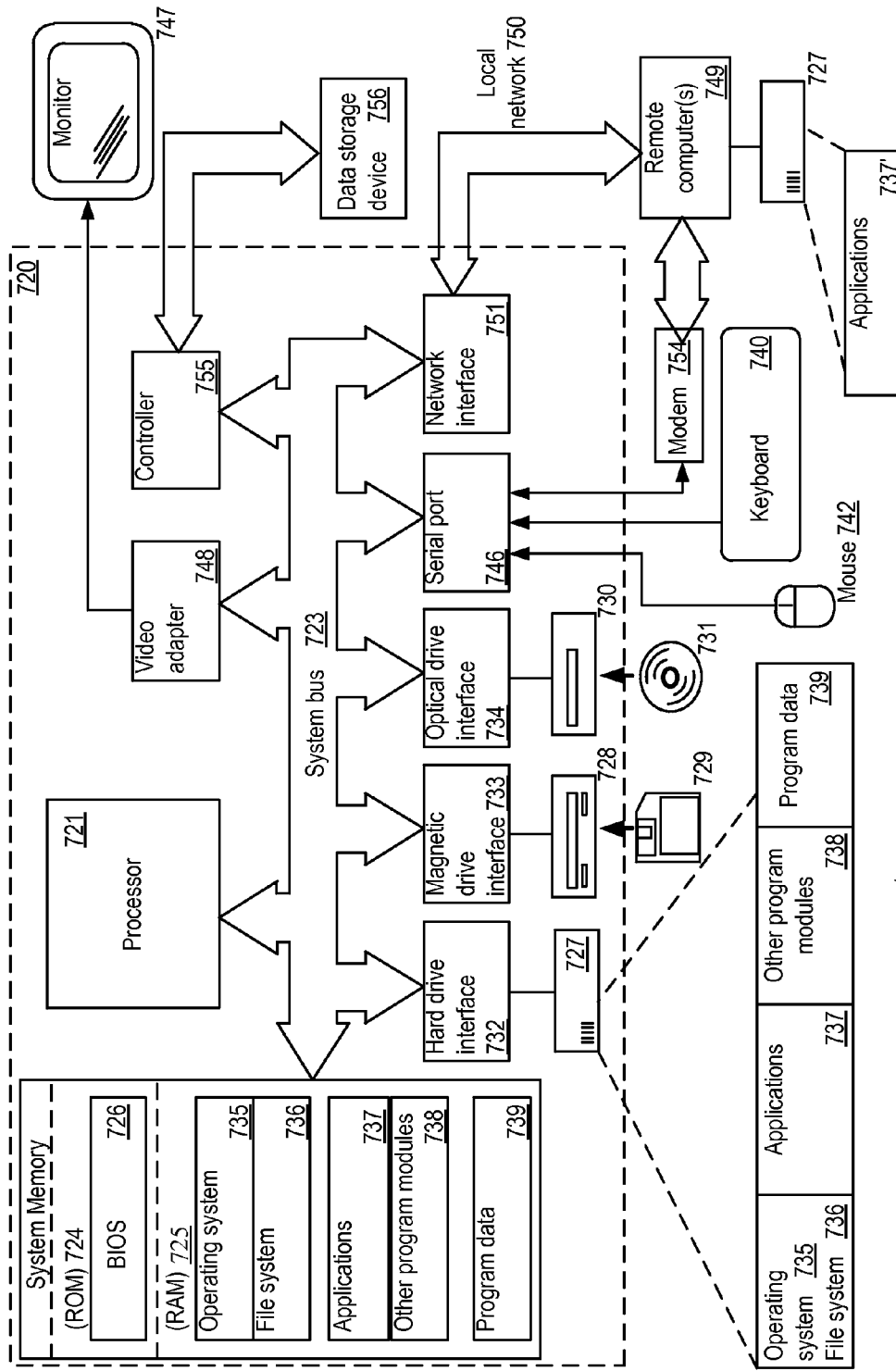
FIG. 7 is a block diagram of a computer system on which various engines can carry out a function or set of functions of the instant invention, according to embodiments.

FIG. 7 is a diagram illustrating in greater detail a computer system 700 on which aspects of the invention as described herein may be implemented according to various embodiments.

The computer system 700 can comprise a computing device such as a personal computer 720 includes one or more processing units 721, a system memory 722 and a system bus 723, which contains various system components, including a memory connected with the one or more processing units 721. In various embodiments, the processing units 721 can include multiple logical cores that are able to process information stored on computer readable media. The system bus 723 is realized as any bus structure known at the relevant technical level, containing, in turn, a bus memory or a bus memory controller, a peripheral bus and a local bus, which is able to interact with any other bus architecture. The system memory can include non-volatile memory such as Read-Only Memory (ROM) 724 or volatile memory such as Random Access Memory (RAM) 725. The Basic Input/Output System (BIOS) 726 contains basic procedures ensuring transfer of information between the elements of personal computer 720, for example, during the operating system boot using ROM 724.

Personal computer 720, in turn, has a hard drive 727 for data reading and writing, a magnetic disk drive 728 for reading and writing on removable magnetic disks 729, and an optical drive 730 for reading and writing on removable optical disks 731, such as CD-ROM, DVD-ROM and other optical media. The hard drive 727, the magnetic drive 728, and the optical drive 730 are connected with system bus 723 through a hard drive interface 732, a magnetic drive interface 733 and an optical drive interface 734, respectively. The drives and the corresponding computer information media represent energy-independent means for storage of computer instructions, data structures, program modules and other data on personal computer 720.

The system depicted includes hard drive 727, a removable magnetic drive 729 and a removable optical drive 730, but it should be understood that it is possible to use other types of computer media, capable of storing data in a computer-readable form (solid state drives, flash memory cards, digital disks, random-access memory (RAM), etc.), connected to system bus 723 through a controller 755.

The computer 720 comprises a file system 736, where the recorded operating system 735 is stored, as well as additional program applications 737, other program engines 738 and program data 739. The user can input commands and information into the personal computer 720 using input devices (keyboard 740, mouse 742). Other input devices (not shown) can also be used, such as: a microphone, a joystick, a game console, a scanner, etc. Such input devices are usually connected to the computer system 720 through a serial port 746, which, in turn, is connected to a system bus, but they can also be connected in a different way—for example, using a parallel port, a game port or a Universal Serial Bus (USB). The monitor 747 or another type of display device is also connected to system bus 723 through an interface, such as a video adapter 748. In addition to monitor 747, personal computer 720 can be equipped with other peripheral output devices (not shown), such as speakers, a printer, etc.

Personal computer 720 is able to work in a network environment; in this case, it uses a network connection with one or several other remote computers 749. Remote computer(s) 749 is (are) similar personal computers or servers, which have most or all of the above elements, noted earlier when describing the substance of personal computer 720 shown in FIG. 7. The computing network can also have other devices, such as routers, network stations, peering devices or other network nodes.

Network connections can constitute a Local Area Network (LAN) 750 and a World Area Network (WAN). Such networks are used in corporate computer networks or in corporate intranets, and usually have access to the Internet. In LAN or WAN networks, personal computer 720 is connected to the Local Area Network 750 through a network adapter or a network interface 751. When using networks, personal computer 720 can use a modem 754 or other means for connection to a world area network, such as the Internet. Modem 754, which is an internal or an external device, is connected to system bus 723 through serial port 746. It should be clarified that these network connections are only examples and do not necessarily reflect an exact network configuration, i.e. in reality there are other means of establishing a connection using technical means of communication between computers.

Figure 8:
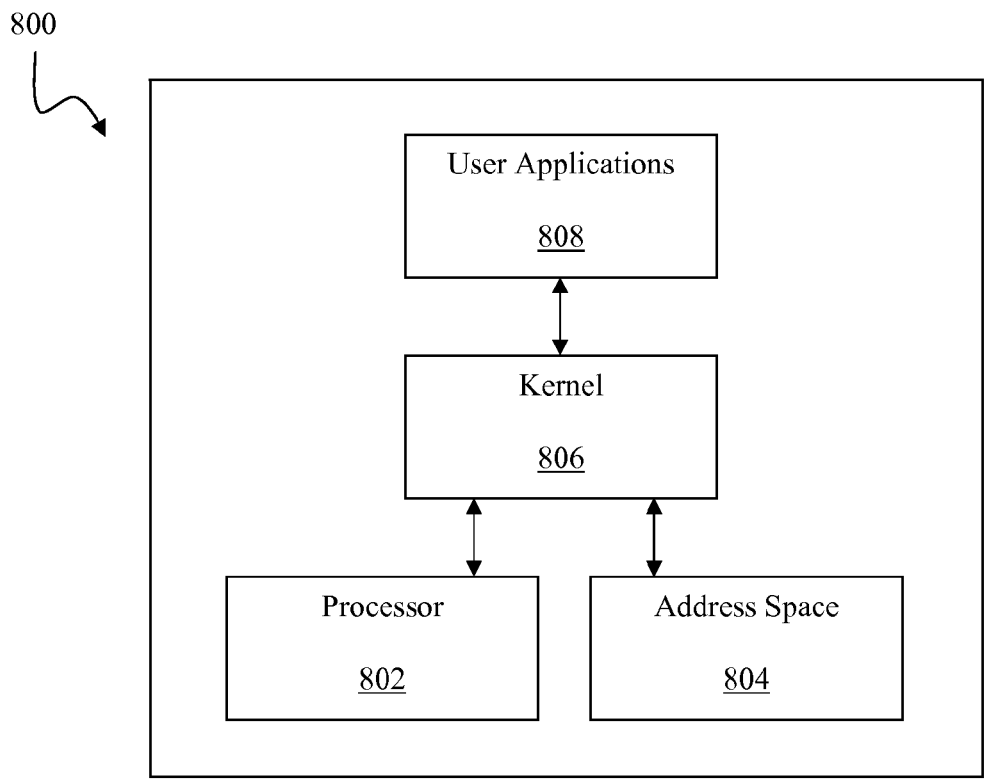
FIG. 8 is a block diagram of a computer system for handling system calls, according to an embodiment.

Referring to FIG. 8, a block diagram of a system for handling system calls is depicted, according to an embodiment. System 800 comprises a processor 802, address or memory space 804, a kernel 806, and one or more user applications 808.

In an embodiment, processor 802 can be any programmable device that accepts digital data as input, is configured to process the input according to instructions or algorithms, and provides results as outputs. In an embodiment, processor 802 can be a central processing unit (CPU) configured to carry out the instructions of a computer program. Processor 802 is therefore configured to perform basic arithmetical, logical, and input/output operations.

The address space 804 of operably coupled memory can comprise volatile or non-volatile memory as required by the coupled processor 804 and kernel 806 to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

Kernel 806 comprises an engine that manages input/output requests from software, and translates the requests into data processing instructions for processor 802. In an embodiment, kernel 806 mediates access to the resources of a computer.

User applications 808 comprises one or more programs designed to carry out operations for a specific application. In embodiments, one of the user applications 808 can comprise a malicious program that embodiments of systems can detect.

System 800 can therefore comprise a loading engine and/or intercept engine as described herein with respect to, for example, FIGS. 5-6. For example, the respective hardware calls from one or more engine instruction sets can be executed by processor 802, taking into account address space 804, kernel 806, and user applications 808 as described herein.

Figure 9:
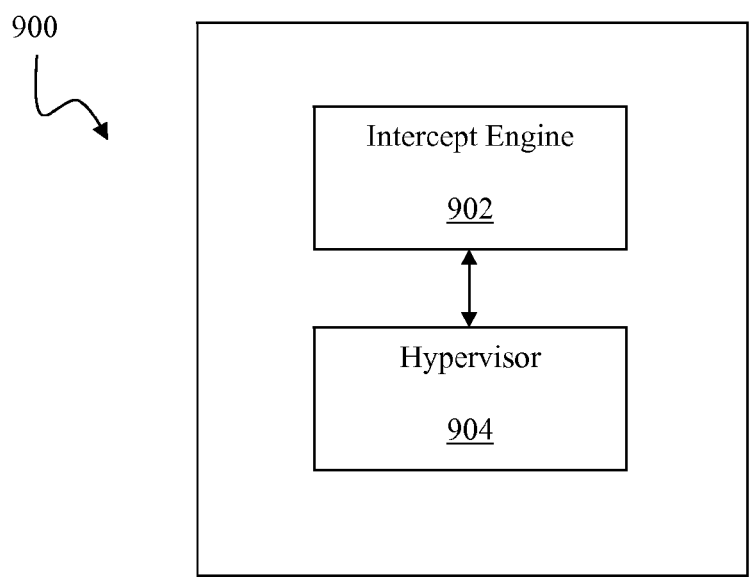
FIG. 9 is a block diagram of a system for handling system calls that can be implemented on the computer system of FIG. 8, according to an embodiment.

For example, referring to FIG. 9, a block diagram of a system 900 for handling system calls that can be implemented on the computer system of FIG. 8 is depicted, according to an embodiment.

System 900 comprises an intercept engine 902 and a hypervisor 904. Intercept engine 902 comprises processor instructions for loading a system call handler. In embodiments, intercept engine 902 further comprises processor instructions for intercepting system calls. In other embodiments, a loading engine comprises processor instructions for loading a system call handler, and an intercept engine comprises processor instructions for intercepting system calls. The functionality or scope of the respective engines are not intended to be limited by the descriptions herein; rather, these embodiments are given only by way of example and are not intended to limit the scope of the invention.

In an embodiment, hypervisor 904 is substantially similar to hypervisor 400 described herein. Hypervisor 904 is configured to control at least one of the processor registers; for example, those implemented or accessible by kernel 806 and/or processor 802.

In operation, intercept engine 902 is configured to create modified kernel 806 structures as described herein. In embodiments, a modified system call handler is generated. In embodiments, a modified system call table is generated. Intercept engine 902 is further configured to determine a memory address of an original system call handler. Intercept engine 902 is further configured to determine a size of a loaded image of the original system call handler. Intercept engine 902 is further configured to create a copy of the original system call handler as a second handler. Intercept engine 902 is further configured to intercept, by the second handler, a computing device system call. In an embodiment, intercept engine 902 is further configured to conduct an antivirus analysis on the intercepted computing device call.

The embodiments above are intended to be illustrative and not limiting. Additional embodiments are within the claims. In addition, although as aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A machine-implemented method for intercepting computing device system calls, the computing device including a kernel including a system call table, the method comprising:
executing a hypervisor on the computing device, the hypervisor configured to control at least one computing device processor register, the at least one computing device processor register configured to be used by the kernel;
creating at least one modified kernel structure, the modified kernel structure including a modified system call table;
determining a memory address of an original system call handler, the original system call handler configured to receive and execute kernel operation commands;
determining a size of a loaded image of the original system call handler;
creating a copy of the original system call handler as a second system call handler; and
intercepting, by the second system call handler as directed by the hypervisor, a computing device system call.

2. The method of claim 1, further comprising evaluating the intercepted computing device system call for malicious behavior.

3. The method of claim 1, further comprising initializing one or more exceptions tables, the one or more exception tables related to the execution of the code of second system call handler.

4. The method of claim 3, wherein at least one of creating at least one modified kernel structure, determining a memory address of an original system call handler, determining a size of a loaded image of the original system call handler, creating a copy of the original system call handler as a second system call handler, or initializing one or more exceptions tables is performed with a disassembler.

5. The method of claim 1, wherein the system call table comprises a System Service Dispatch Table (SSDT).

6. The method of claim 1, wherein at least one of the computing device processor registers comprises a Machine Specific Register (MSR).

7. The method of claim 1, wherein a Kernel Patch Protection (KPP) engine is unaware of the second system call handler.

8. The method of claim 1, wherein the computing device further includes an operating system, and the hypervisor is executed during operation of the operating system.

9. The method of claim 1, wherein creating a copy of the original system call handler as a second system call handler comprises at least one of address substitution, direct modification of the original system call handler, or modification of the computing device system call.

10. A system for intercepting computing device system calls, the system comprising:
a computing platform including computing hardware of at least one processor, data storage, and input/output facilities, an operating system implemented on the computing hardware, a kernel including a system call table, and a system call handler configured to receive and execute kernel operation commands, a plurality of computing platform processor registers; and
instructions that, when executed on the computing platform, cause the computing platform to implement:
a hypervisor configured to control at least one of the computing platform processor registers, the at least one computing platform processor register configured to be used by the kernel, and
an intercept engine configured to:
create a copy of the system call table as a second system call table,
create a copy of the system call handler as a second system call handler, and
intercept, by the second system call handler as directed by the hypervisor, a computing platform system call.

11. The system of claim 10, wherein the intercept engine is further configured to evaluate the intercepted computing platform system call for malicious behavior.

12. The system of claim 10, wherein the intercept engine is further configured to determine a memory address of the system call handler, and determine a size of a loaded image of the system call handler.

13. The system of claim 12, further comprising a loading engine configured to initialize one or more exceptions tables, the one or more exception tables related to the execution of the code of second system call handler.

14. The system of claim 13, wherein at least one of determining a memory address of an system call handler, determining a size of a loaded image of the system call handler, creating a copy of the system call handler as a second system call handler, or initializing one or more exceptions tables is performed with a disassembler.

15. The system of claim 10, wherein the system call table comprises a System Service Dispatch Table (SSDT).

16. The system of claim 10, wherein at least one of the computing platform processor registers comprises a Machine Specific Register (MSR).

17. The system of claim 10, wherein a Kernel Patch Protection (KPP) engine is unaware of the second system call handler.

18. The system of claim 10, wherein the hypervisor is executed during operation of the operating system.

19. The system of claim 10, wherein creating a copy of the system call handler as a second system call handler comprises at least one of address substitution, direct modification of the system call handler, or modification of the computing platform system call.

20. A system for intercepting computing device system calls, the computing device including a kernel including a system call table, the system comprising:
means for executing a hypervisor configured to control at least one computing device processor register, the at least one computing device processor register configured to be used by the kernel;
means for creating a modified system call table;
means for determining a memory address of an original system call handler, the original system call handler configured to receive and execute kernel operation commands;
means for determining a size of a loaded image of the original system call handler;
means for creating a copy of the original system call handler as a second system call handler; and
means for intercepting, by the second system call handler as directed by the hypervisor, a computing device system call.

* * * * *